(12) United States Patent
Board et al.

(10) Patent No.: US 10,875,495 B2
(45) Date of Patent: Dec. 29, 2020

(54) SEAT BELT ASSEMBLY

(71) Applicant: Ford Global Technologies, LLC, Dearborn, MI (US)

(72) Inventors: Derek Board, Ferndale, MI (US); Richard Edward Ruthinowski, Taylor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 140 days.

(21) Appl. No.: 16/104,448

(22) Filed: Aug. 17, 2018

(65) Prior Publication Data

US 2019/0071051 A1 Mar. 7, 2019

Related U.S. Application Data

(60) Provisional application No. 62/553,706, filed on Sep. 1, 2017.

(51) Int. Cl.
| | |
|---|---|
| *B60R 22/34* | (2006.01) |
| *B60N 2/28* | (2006.01) |
| *B60R 22/26* | (2006.01) |
| *B60R 22/02* | (2006.01) |
| *B60R 22/12* | (2006.01) |
| *A44B 11/25* | (2006.01) |
| *B60N 2/04* | (2006.01) |
| *B60N 2/64* | (2006.01) |

(Continued)

(52) U.S. Cl.
CPC .......... *B60R 22/34* (2013.01); *A44B 11/2561* (2013.01); *B60N 2/04* (2013.01); *B60N 2/2806* (2013.01); *B60N 2/643* (2013.01); *B60R 21/18* (2013.01); *B60R 21/231* (2013.01); *B60R 22/023* (2013.01); *B60R 22/12* (2013.01); *B60R 22/26* (2013.01); *B60R 2022/026* (2013.01); *B60R 2022/263* (2013.01); *B60R 2022/266* (2013.01); *B60R 2022/3402* (2013.01)

(58) Field of Classification Search
CPC ......... B60R 22/34; B60R 22/26; B60R 21/18; B60R 22/023; B60N 2/2806
See application file for complete search history.

(56) References Cited

U.S. PATENT DOCUMENTS

| | | | |
|---|---|---|---|
| 3,583,764 | A | 6/1971 | Lohr et al. |
| 3,600,768 | A | 8/1971 | Romanzi, Jr. et al. |
| 3,885,811 | A | 5/1975 | Takada |

(Continued)

FOREIGN PATENT DOCUMENTS

| | | | | |
|---|---|---|---|---|
| DE | 102008029351 A1 | * | 2/2009 | ......... B60R 22/3405 |
| JP | 03186455 A | * | 8/1991 | |

(Continued)

*Primary Examiner* — Faye M Fleming
(74) *Attorney, Agent, or Firm* — Frank A. MacKenzie; Bejin Bieneman PLC

(57) ABSTRACT

An assembly includes a seat, a lap retractor fixed relative to the seat, a shoulder retractor fixed relative to the seat, and a first buckle fixed relative to the seat. A lap belt is retractably extendable from the lap retractor. A first tongue is fixed to the lap belt and is releasably engageable with the first buckle. A second buckle is fixed to the lap belt. A shoulder belt is retractably extendable from the shoulder retractor. A second tongue is fixed to the shoulder belt and is releasably engageable with the second buckle.

18 Claims, 8 Drawing Sheets

(51) Int. Cl.
*B60R 21/18* (2006.01)
*B60R 21/231* (2011.01)

(56) References Cited

U.S. PATENT DOCUMENTS

| | | | |
|---|---|---|---|
| 4,915,413 A | 4/1990 | Meyer | |
| 5,088,794 A * | 2/1992 | Iwami | B60R 22/20 297/475 |
| 5,403,038 A | 4/1995 | McFalls | |
| 5,611,604 A * | 3/1997 | Thomas | B60R 22/26 297/478 |
| 6,305,713 B1 * | 10/2001 | Pywell | B60N 2/2222 280/801.1 |
| 6,309,024 B1 | 10/2001 | Busch | |
| 6,334,628 B1 * | 1/2002 | Newball | B60R 22/34 280/801.1 |
| 6,837,547 B2 * | 1/2005 | Delventhal | A44B 11/2549 297/467 |
| 6,871,876 B2 * | 3/2005 | Xu | A44B 11/2549 280/801.1 |
| 6,902,194 B2 * | 6/2005 | Russell | B60R 22/023 280/801.1 |
| 7,063,389 B2 * | 6/2006 | Kennedy, Sr. | B60N 2/688 297/475 |
| 7,156,469 B2 | 1/2007 | Kennedy, Sr. | |
| 7,922,205 B2 * | 4/2011 | David | B60R 22/024 280/801.1 |
| 8,066,303 B2 * | 11/2011 | Nezaki | B60R 21/18 280/806 |
| 8,517,424 B2 * | 8/2013 | Brents | B60R 22/30 280/801.1 |
| 8,550,566 B2 | 10/2013 | Wada | |
| 8,590,935 B1 * | 11/2013 | Leedy | B60R 22/321 180/270 |
| 8,864,174 B2 * | 10/2014 | Minami | B60N 2/36 280/756 |
| 9,156,433 B2 * | 10/2015 | Nagasawa, Sr. | B60R 22/12 |
| 9,669,796 B2 * | 6/2017 | Ohno | B60R 22/06 |
| 10,562,480 B2 * | 2/2020 | Nagasawa | B60R 21/18 |
| 2013/0249270 A1 | 9/2013 | Kawai | |
| 2015/0014975 A1 * | 1/2015 | Bahattab | B60R 22/32 280/801.1 |
| 2019/0291678 A1 * | 9/2019 | Cho | B60R 21/233 |

FOREIGN PATENT DOCUMENTS

| | | |
|---|---|---|
| JP | 2012218659 A * | 11/2012 |
| JP | 2018176914 A * | 11/2018 |

* cited by examiner

SEAT BELT ASSEMBLY

CROSS-REFERENCE TO RELATED APPLICATION

The subject patent application claims priority to and all the benefits of U.S. Provisional Patent Application No. 62/553,706 filed on Sep. 1, 2017, which is herein incorporated by reference in its entirety.

BACKGROUND

A seat belt assembly in a vehicle may include at least one belt, at least one retractor, and at least one buckle. The buckle and the retractor are mounted to the vehicle, e.g., a seat or a body of the vehicle. The belt is retractably extendable from the retractor, and the belt is releasably engageable with the buckle, e.g., with a tongue. One type of seat belt assembly is a two-point seat belt assembly, in which the belt engages the seat/body of the vehicle at two points, e.g., the retractor and the buckle. Another type of seat belt assembly is a three-point seat belt assembly, in which the belt engages the seat/body of the vehicle at three points, e.g., the retractor, the buckle, and another retractor.

DETAILED DESCRIPTION

Figure 1:
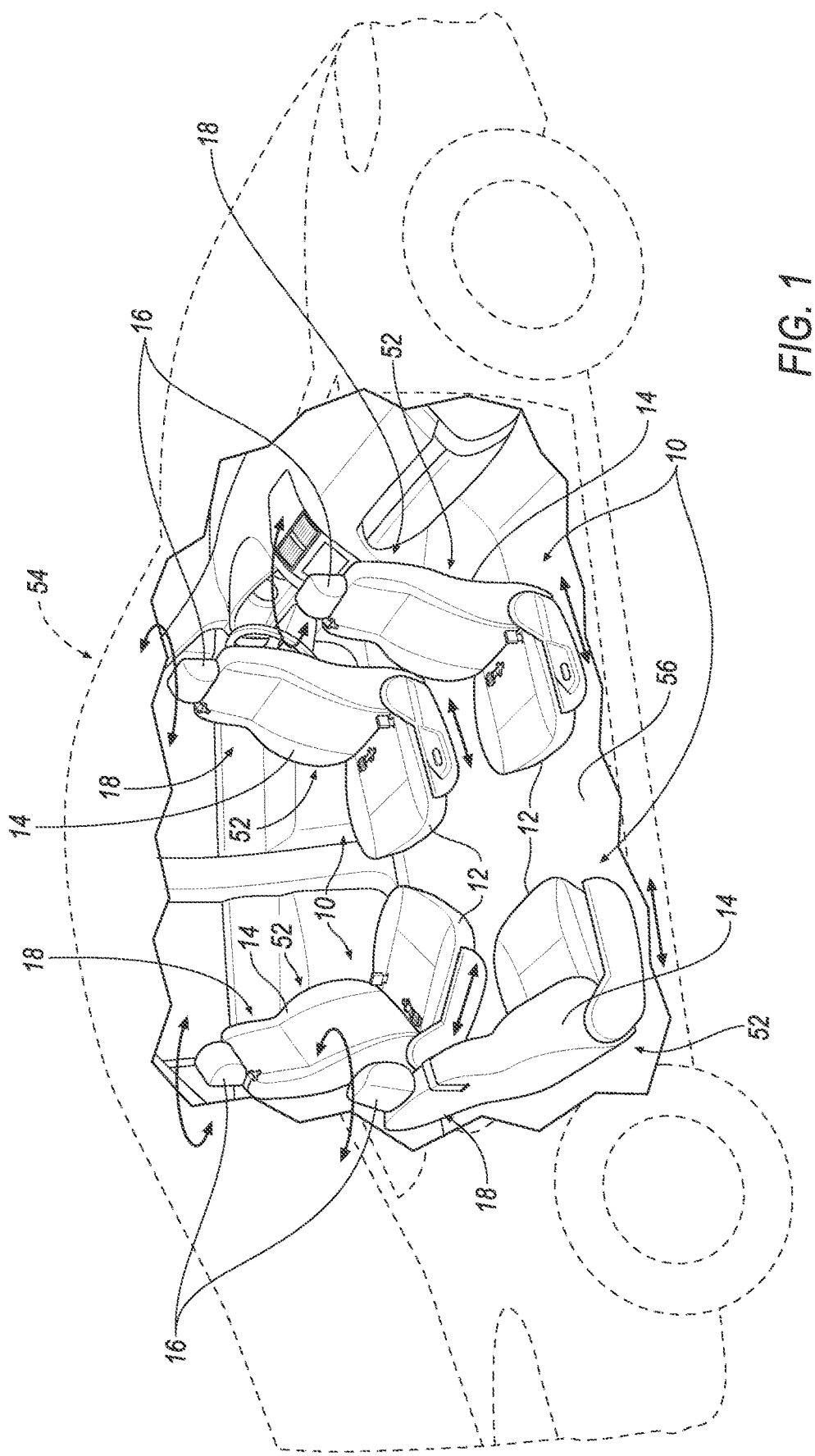
FIG. 1 is a perspective view of a vehicle including four seat assemblies each having a seat belt assembly.

An assembly includes a seat, a lap retractor fixed relative to the seat, and a lap belt retractably extendable from the lap retractor. A shoulder retractor is fixed relative to the seat and a shoulder belt is retractably extendable from the shoulder retractor. A first tongue is fixed to the lap belt. A first buckle is fixed relative to the seat and is releasably engageable with the first tongue. A second buckle is fixed to the lap belt. A second tongue is fixed to the shoulder belt and is releasably engageable with the second buckle.

The lap retractor may be fixed to the seat. The shoulder retractor may be fixed to the seat. The first buckle may be fixed to the seat. One or more of the lap and shoulder retractors and first buckle may also be fixed to the vehicle body (such as a floor, package tray, pillar, roof, etc. as applicable).

The lap belt has a first end and a second end, the first end being engaged with the lap retractor and the second end being fixed to the first tongue. The second buckle may be fixed to the second end.

The shoulder belt has a first end and a second end, the first end being engaged with the shoulder retractor and the second end being fixed to the second tongue.

The lap belt may be configured to engage a child restraint seat on the seat when the first tongue is engaged with the first buckle and the second tongue is disengaged with the second buckle.

The assembly may include a floor, wherein the seat is moveable relative to the floor.

The first buckle, the second buckle, the first tongue, and the second tongue may be configured so that the first tongue is engageable with the first buckle and not engageable with the second buckle and so that the second tongue is engageable with the second buckle and not engageable with the first buckle.

The first tongue and the second tongue may have a different size and/or shape than each other.

The seat may include a seat back having a front with the lap belt extending across the front of the seat back when the first tongue is engaged with the first buckle, and an airbag may be supported by the seat and inflatable across the front of the seat back to provide occupant restraint and/or to encapsulate a portion of the seated occupant, i.e., the occupant is between the seat back and the airbag when the airbag is inflated. The seat back may have a pair of bolsters spaced from each other and the airbag may be supported by the seat back and extend from one bolster to the other bolster.

A seat belt assembly includes a lap retractor and a lap belt retractably extendable from the lap retractor. A shoulder retractor and a shoulder belt are retractably extendable from the shoulder retractor. A first tongue is fixed to the lap belt. A first buckle is releasably engageable with the first tongue. A second buckle is fixed to the lap belt. A second tongue is fixed to the shoulder belt and is releasably engageable with the second buckle.

The lap belt has a first end and a second end, the first end being engaged with the lap retractor and the second end being fixed to the first tongue. The second buckle may be fixed to the second end. The shoulder belt may have a first end and a second end, the first end being engaged with the shoulder retractor and the second end being fixed to the second tongue.

With reference to the Figures, wherein like numerals indicate like parts throughout the several views, an assembly 10 for a vehicle 54 is generally shown. The assembly 10 includes a seat 52 and a seat belt assembly 18. The seat belt assembly 18 includes a lap retractor 20 fixed relative to the seat 52, and a shoulder retractor 22 fixed relative to the seat 52. A lap belt 26 is retractably extendable from the lap retractor 20 and a shoulder belt 32 is retractably extendable from the shoulder retractor 22. A first tongue 28 is fixed to the lap belt 26. A first buckle 24 is fixed relative to the seat 52 and is releasably engageable with the first tongue 28. A second buckle 30 is fixed to the lap belt 26. A second tongue 34 is fixed to the shoulder belt 32 and is releasably engageable with the second buckle 30.

The seat belt assembly 18 may be alternately configured as a two-point seat belt assembly and a three-point seat belt assembly. Specifically, the first tongue 28 fixed to the lap belt 26 may engage the first buckle 24, thus creating a two-point seat belt assembly. The second tongue 34 fixed to the shoulder belt 32 may engage the second buckle 30 fixed to the lap belt 26, and the first tongue 28 fixed to the lap belt 26 may engage the first buckle 24, thus creating a three-point seat belt assembly. By having the second tongue 34 and the second buckle 30, the seat belt assembly 18 is able to operate as either a two-point seat belt assembly or a three-point seat belt assembly.

Since both the first tongue 28 and the second buckle 30 are fixed to the lap belt 26, the first tongue 28 and the second buckle 30 move together as a unit, allowing for easy accessibility and operation of the lap belt 26 and easy cooperation with the second tongue 34 and the shoulder belt 32.

With reference to FIG. 1, the assembly 10 is generally shown. The assembly 10 may include a seat bottom 12, a seat back 14 supported by the seat bottom 12, a headrest 16 supported by the seat back 14, and the seat belt assembly 18. The vehicle 54 may include more than one assembly 10. As an example, and as shown in FIG. 1, the vehicle 54 may include four seat assemblies 10. Each of the seat assemblies 10 may be identical, or nearly identical, to each other. The seat assemblies 10 may be located at any suitable position in the vehicle 54. Where multiple seats are included, the seats may differ in their construction, seating capacity and orientation ("bench seats", "captains chairs", rear facing, front facing, etc.).

The assembly 10 is positioned in the vehicle 54. The vehicle 54 may be, for example, any type of passenger automobile. The vehicle 54, for example, may be an autonomous vehicle. Specifically, a computer may operate the vehicle 54 in an autonomous mode, a semi-autonomous mode, or a non-autonomous mode. For purposes of this disclosure, an autonomous mode is defined as one in which each of vehicle propulsion, braking, and steering are controlled by the computer; in a semi-autonomous mode the computer controls one or two of vehicles propulsion, braking, and steering; in a non-autonomous mode, a human operator controls the vehicle propulsion, braking, and steering.

With reference to FIG. 1, the vehicle 54 may include a floor 56, i.e., a vehicle floor. The floor 56 supports the seat 52.

The seat 52 may be moveable relative to the floor 56. The seat bottom 12 may be rotatable with respect to a floor of a vehicle and the seat back 14 may be rotatable with respect to the seat bottom 12. As an example, the seat 52 may be rotatably connected with the floor 56 and the seat bottom 12 may be rotatable with the floor 56 around a first axis (not shown) that extends transverse to the floor 56, e.g., perpendicular to the floor 56. In such an example, the seat 52 may be indirectly fixed to the floor 56, i.e. the seat 52 may be fixed to the floor 56 through an intermediate component such as a track centered at the first axis. As another example, the seat 52 may be slideably connected with the floor 56 and the seat bottom 12 may be slideable along the floor 56. The seat back 14 may be pivotally connected to the seat bottom 12 and may be pivotally moveable with respect to the seat bottom 12. As another example, the seat bottom 12 may be both rotatable and slidable relative to floor 56. As another example, the seat bottom 12 may be fixed relative to floor 56 and seatback 14 may be fixed or pivotally adjustable relative to seat bottom 12.

The headrest 16 may be adjustable relative to the seat back 14, i.e., adjustable along a longitudinal axis of the seat back 14.

The assembly 10 may include an airbag 66 that is inflatable in front of an occupant seated on the seat 52. As an example, the airbag 66 may be used when the seat belt assembly 18 is in the two-point position, i.e., the first tongue 28 engaged with the first buckle 24 and the second tongue 34 disengaged with the second buckle 30. The seat back 14 has a front with the lap belt 26 extending across the front of the seat back and atop the seat bottom in the two-point position when the first tongue 28 is engaged with the first buckle 24. The airbag 66 may be supported by the seat 52 and is inflatable across the front of the seat back 14. Specifically, the seat back 14 has a pair of bolsters spaced from each other on opposite sides of the seat back 14, and the airbag 66 is supported by the seat back 14 and extends from one bolster to the other bolster. The airbag 66 may, for example, deploy from the bolsters or from behind the bolsters. The airbag 66 may be mounted to the seat back 14 and supported by the seat back 14 in an uninflated position and in an inflated position. In the inflated position, the airbag 66 extends across the front of the seat back 14 with the occupant disposed between the airbag 66 and the front of the seat back 14. In the configuration described above where the seat 52 is rotatable relative to the floor 56 about the first axis, airbag 66 and the seat belt assembly 18, being mounted to and supported by the seat, move as a unit as the seat 52 is rotated. This configuration may be useful when the vehicle 54 is an autonomous vehicle.

Figure 2:
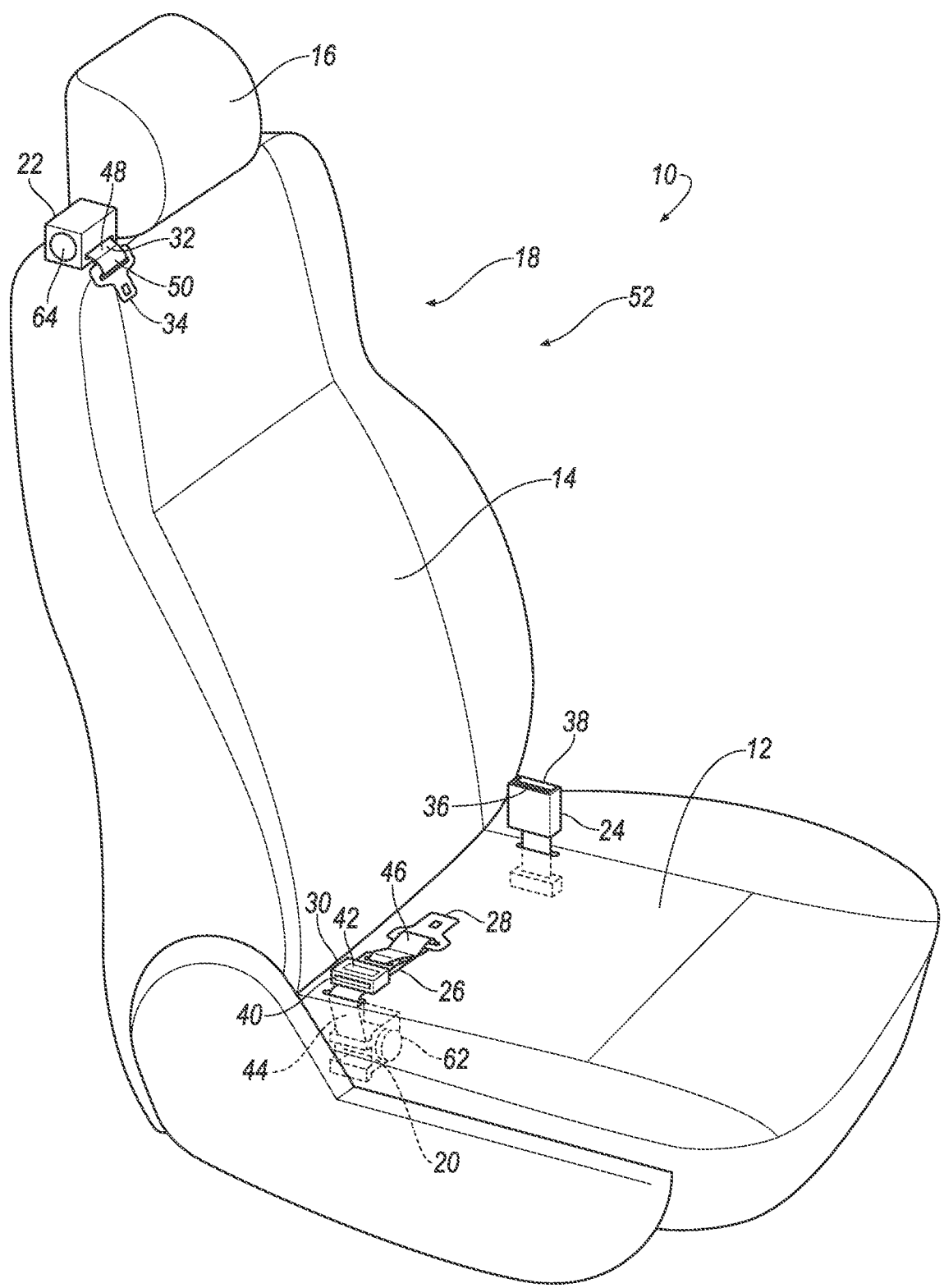
FIG. 2 is a perspective view of one seat assembly with the seat belt assembly in a completely unbuckled position and a shoulder retractor on the seat back.
Figure 3:
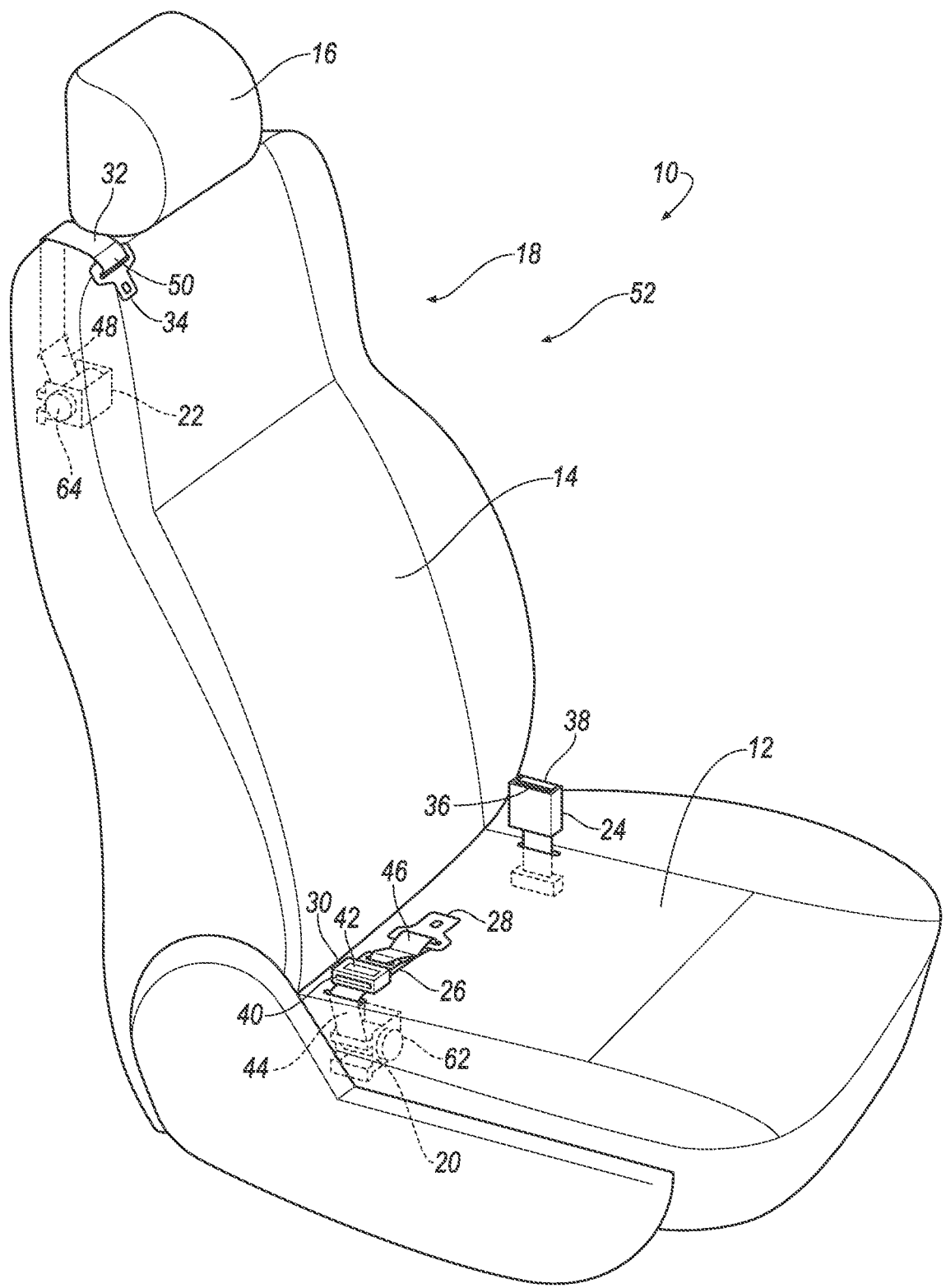
FIG. 3 is a perspective view of the seat assembly with the seat belt assembly in a completely unbuckled position and the shoulder retractor in the seat back.
Figure 4:
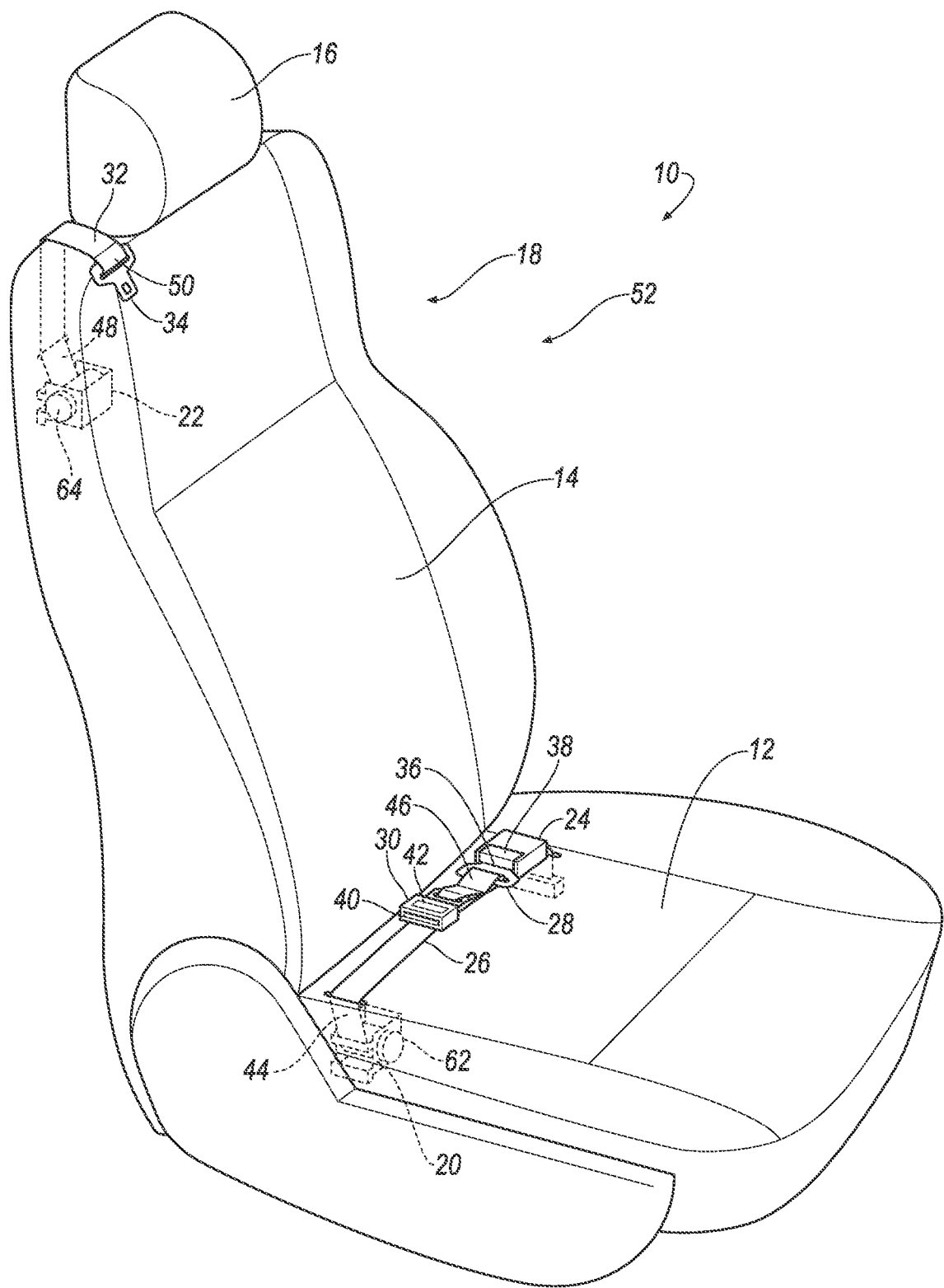
FIG. 4 is a perspective view of the seat belt assembly positioned in a two-point seat belt configuration.
Figure 5:
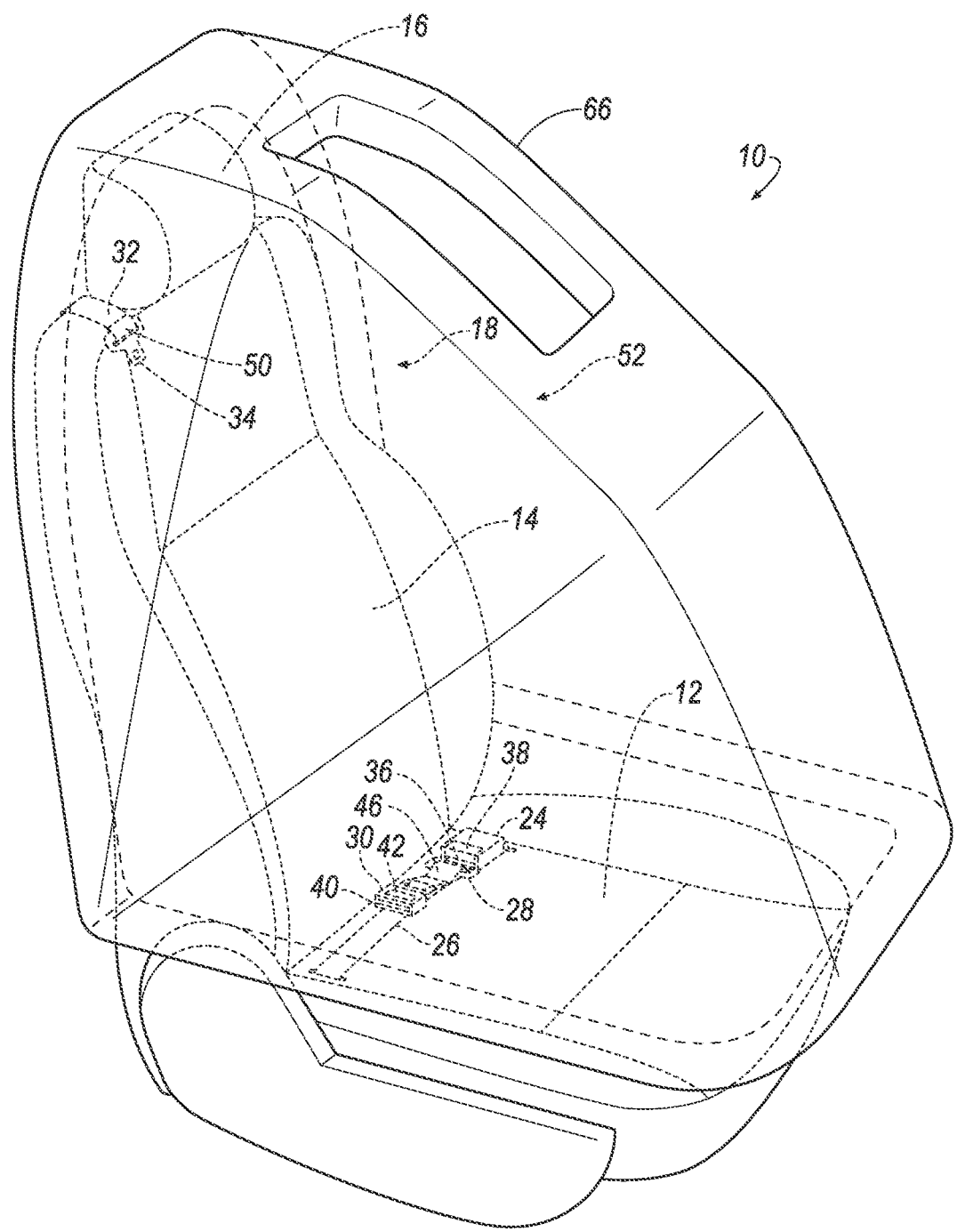
FIG. 5 is a perspective view of the seat belt assembly positioned in a two-point seat belt configuration with an airbag mounted to the seat and inflated to an inflated position.
Figure 6:
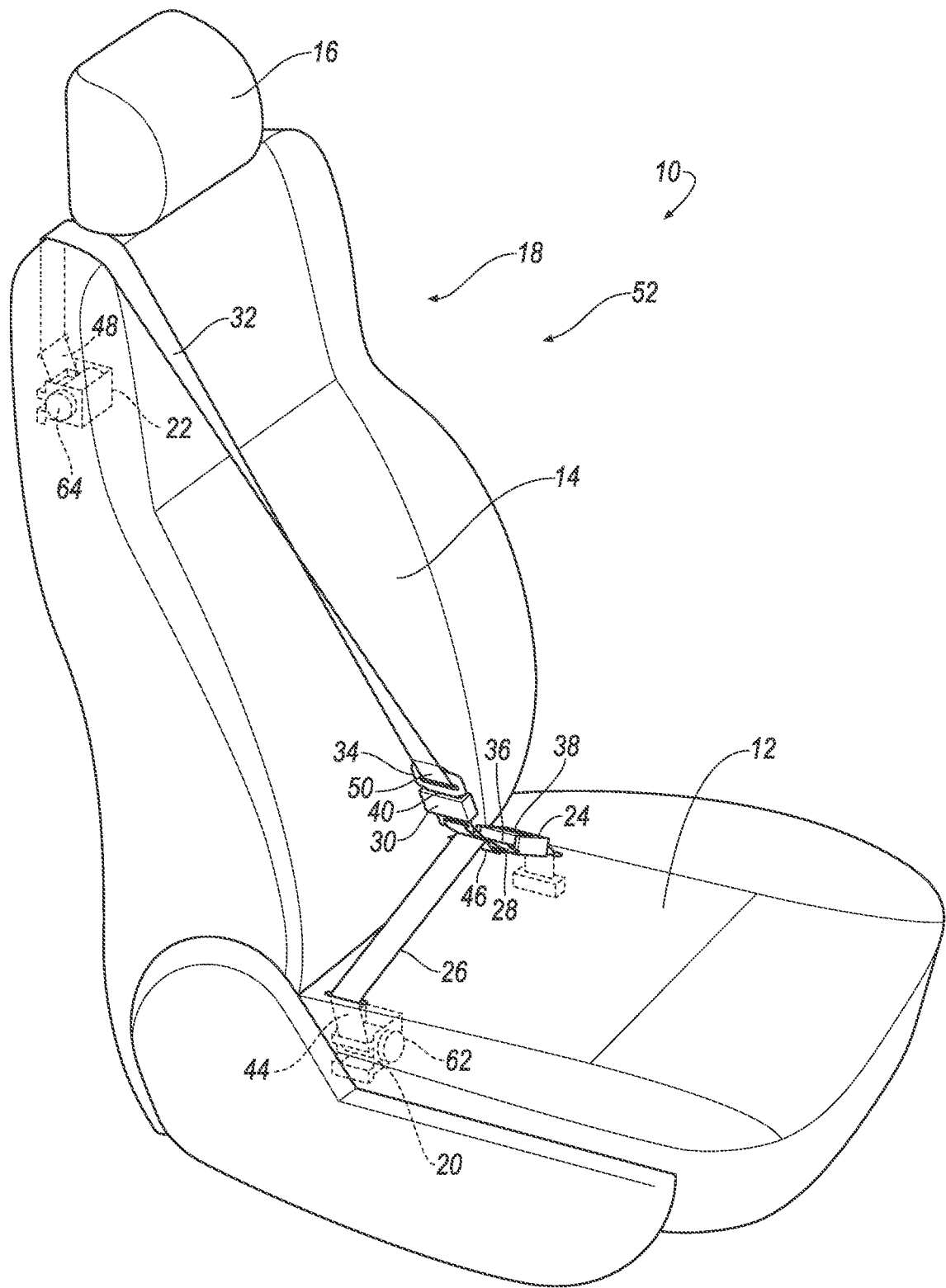
FIG. 6 is a perspective view of the seat belt assembly in a three-point seat belt configuration.
Figure 7:
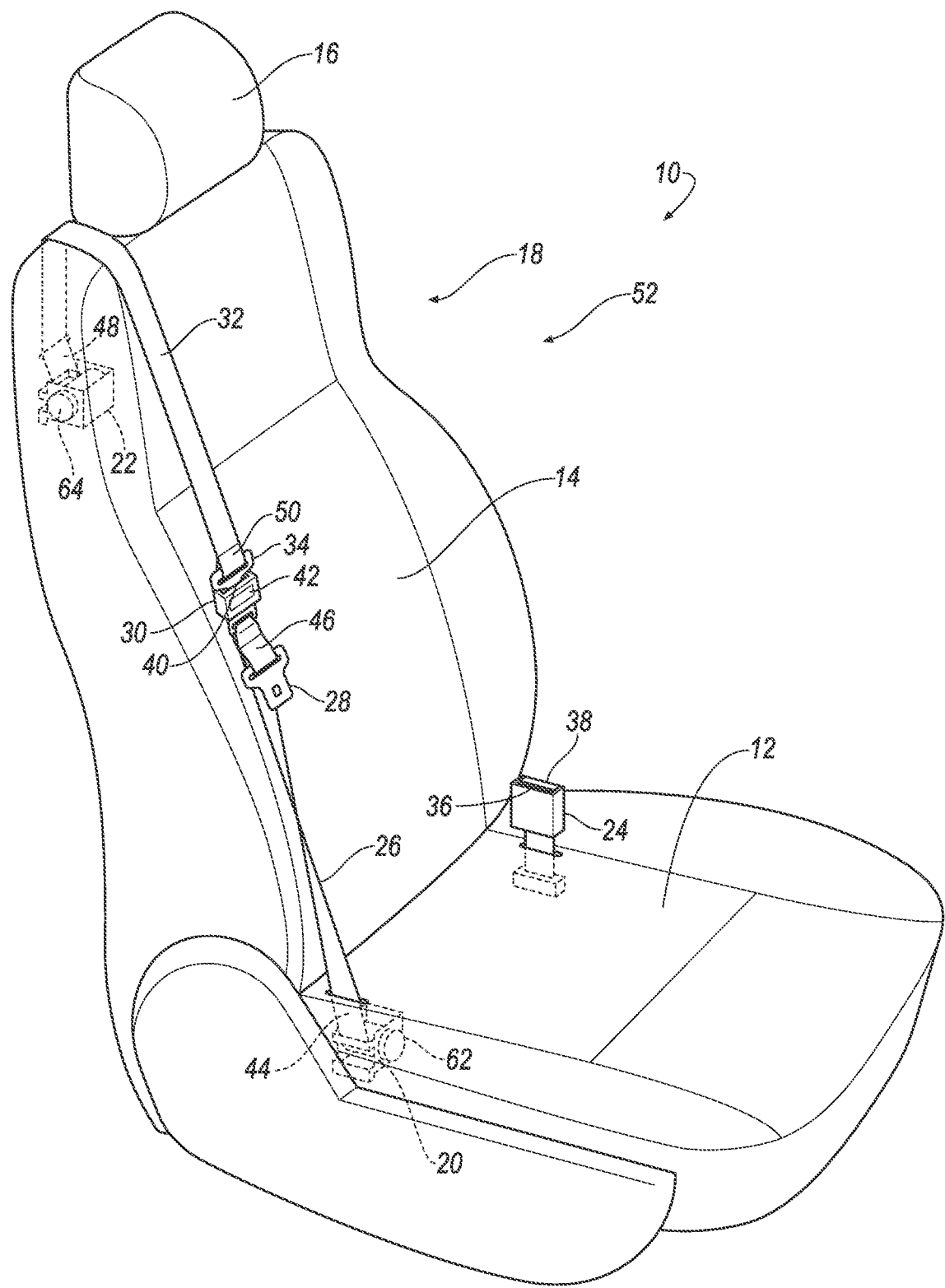
FIG. 7 is a perspective view of the seat belt assembly in a shoulder-buckled configuration.
Figure 8:
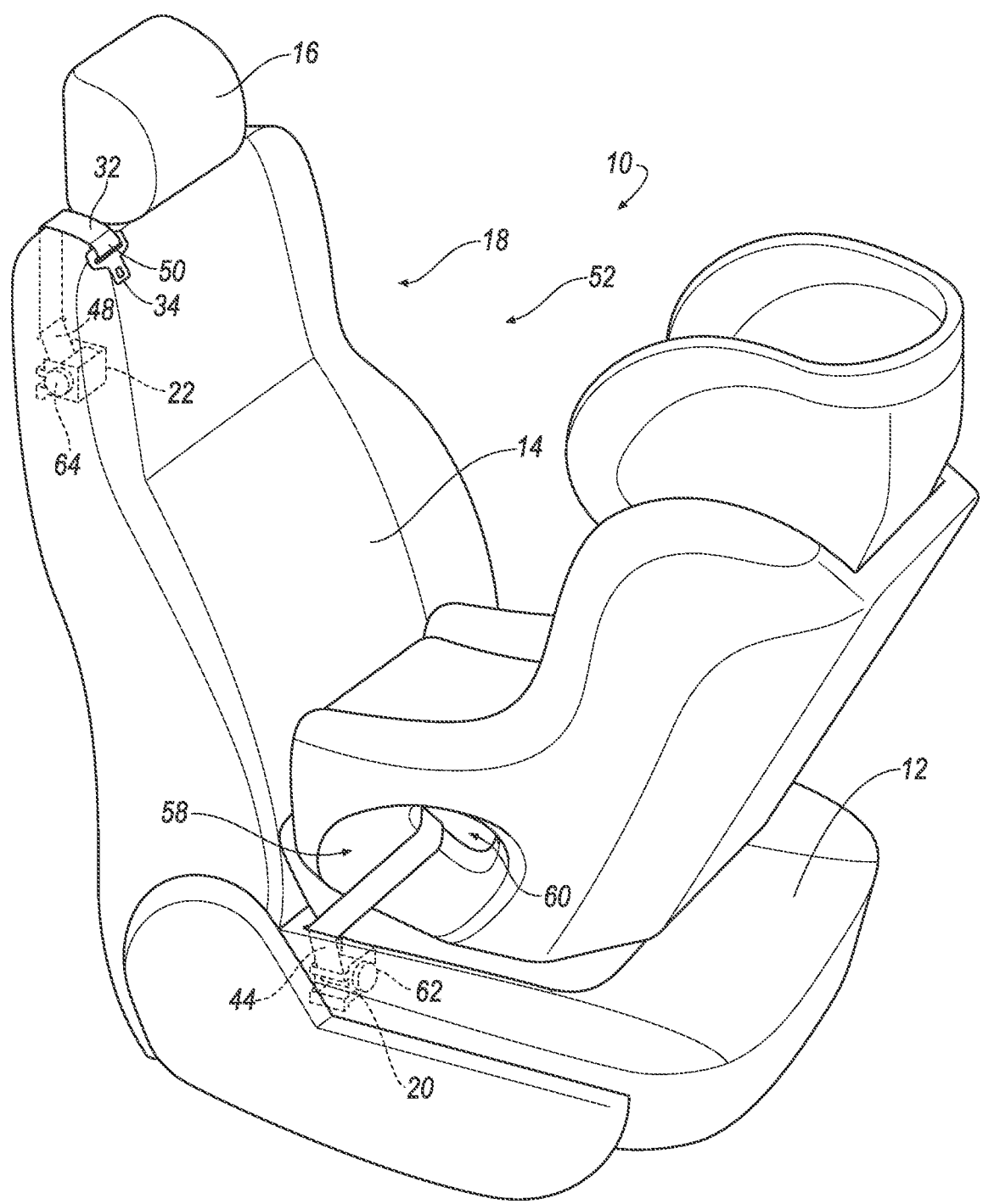
FIG. 8 is a perspective view of the seat belt assembly in the two point seat belt configuration with a child restraint seat.

The seat belt assembly 18 may operate in a variety of positions. For example, the seat belt assembly 18 may be positioned in a completely unbuckled position (FIGS. 1-3), a two-point seat belt configuration (FIGS. 4, 5, and 7), a three-point seat belt configuration (FIG. 6), and a shoulder bucked position (FIG. 7). In the completely unbuckled position, as shown in FIG. 1-3, the first tongue 28 is not engaged with the first buckle 24, and the second tongue 34 is not engaged with the second buckle 30. In the two point seat belt configuration, as shown in FIGS. 4, 5, and 8, the first tongue 28 is engaged with the first buckle 24, and the second tongue 34 is disengaged with the second buckle 30. In the two-point seat belt configuration, as shown in FIG. 6, the first tongue 28 is engaged with the first buckle 24, and the second tongue 34 is engaged with the second buckle 30. In the shoulder-buckled configuration, as shown in FIG. 7, the first tongue 28 is not engaged with the first buckle 24, and the second tongue 34 is engaged with the second buckle 30.

With reference to FIG. 1, the seat belt assembly 18 may include the lap retractor 20 and the shoulder retractor 22. The lap retractor 20 and/or the shoulder retractor 22 may be fixed relative to the seat 52. Specifically, the lap retractor 20 and/or the shoulder retractor 22 may be fixed to the seat 52, i.e., directly attached to the seat with no intermediate component (such as a mounting bracket) therebetween, e.g., by fasteners, welding, etc.

As an example, the lap retractor 20 may be fixed to one of the seat bottom 12 and the seat back 14. As another example, the shoulder retractor 22 may be fixed to one of the seat bottom 12 and the seat back 14. As another example, the lap retractor 20 and the shoulder retractor 22 may be fixed to a frame or load bearing member of the vehicle, or any suitable location (for example, a floor, pillar, roof, package tray, etc.), i.e., directly attached with no intermediate component (such as an attaching bracket) therebetween, e.g., by fasteners, welding, etc.

As an example, and with reference to FIGS. 2-8, the lap retractor 20 may be fixed to the seat 52, i.e., attached to the seat 52 directly with no intermediate component therebetween. The lap retractor 20 may be attached directly to the seat 52 by any suitable way including bracketry, fasteners, welding, etc. As another example, the lap retractor 20 may be indirectly connected to the seat 52, i.e., through an intermediate component such as the floor 56 supporting the seat 52. As another example, the lap retractor 20 may be attached to a load bearing component of the frame or body (not numbered) of the vehicle 54.

The lap belt 26 may have a first end 44 and a second end 46. The lap belt 26 is retractably extendable from the lap retractor 20. The first end 44 is engaged with the lap retractor 20 and the second end 46 is fixed to the first tongue 28. With reference to FIGS. 2-8, the lap retractor 20 may include a first spool 62 for receiving the lap belt 26. The lap belt 26 may be retractable to a retracted position, and may be extendable to an extended position. In the retracted position, as shown in FIGS. 2-3, the lap belt 26 may be retracted into the lap retractor 20 and the lap belt 26 may be wound around the first spool 62. In the extended position, the lap belt 26 may be paid out of the lap retractor 20. As an example, and as shown in FIGS. 4-6 and 8, the lap belt 26 may be paid out of the lap retractor 20 toward the first buckle 24. As another example and as shown in FIG. 7, the lap belt 26 may be paid out of the lap retractor 20 toward the second tongue 34.

As an example and with reference to FIGS. 2-8, the shoulder retractor 22 may be fixed to the seat 52, i.e., attached to the seat 52 directly with no intermediate component therebetween. The shoulder retractor 22 may be attached directly to the seat 52 in any suitable way including bracketry, fasteners, welding, etc. As another example, the shoulder retractor 22 may be indirectly connected to the seat 52, i.e., through an intermediate component such as the floor 56 supporting the seat 52. As another example, the shoulder retractor 22 may be attached to a load bearing component of the frame or body (not numbered) of the vehicle 54.

The shoulder belt 32 may have a first end 48 and a second end 50. The shoulder belt 32 is retractably extendable from the shoulder retractor 22. The first end 48 is engaged with the shoulder retractor 22 and the second end 50 may be fixed to the second tongue 34. With reference to FIGS. 2-8, the shoulder retractor 22 may include a second spool 64 for receiving the shoulder belt 32. The shoulder belt 32 may be retractable to a retracted position, and may be extendable to an extended position. In the retracted position, as shown in FIGS. 1-4, 5, and 8, the shoulder belt 32 may be retracted into the shoulder retractor 22 and the shoulder belt 32 may be wound around the second spool 64. In the extended position, as shown in FIGS. 6-7, the shoulder belt 32 may be paid out of the shoulder retractor 22 toward the second buckle 30.

The lap retractor 20 and the shoulder retractor 22 may each operate in a locked state and an unlocked state. In the locked state, the lap retractor 20 locks the lap belt 26 to prevent the lap belt 26 from extending from the lap retractor 20, and the shoulder retractor 22 locks the shoulder belt 32 to prevent the shoulder belt 32 from extending from the shoulder retractor 22. For example, the lap retractor 20 and the shoulder retractor 22 may operate in the locked state during sudden decelerations of the vehicle 54. In the unlocked state, the lap belt 26 is selectively extendable from the lap retractor 20, and the shoulder belt 32 is selectively extendable from the shoulder retractor 22. For example, the lap retractor 20 and the shoulder retractor 22 may operate in the unlocked state by default. The lap retractor 20 and the shoulder retractor 22 may independently move between the locked state and the unlocked state. In other words, the lap retractor 20 may move between the locked state and the unlocked state independently of the shoulder retractor 22, and the shoulder retractor 22 may move between the locked state and the unlocked state independently of the lap retractor 20.

The lap belt 26 and the shoulder belt 32 may be formed of the same material or of different material. For example, the lap belt 26 and the shoulder belt 32 may be formed of a woven fabric, such as woven nylon, or any suitable material.

The first buckle 24 is fixed relative to the seat 52. As an example, the first buckle 24 may be fixed to the seat 52, i.e., directly attached with no intermediate component. As another example, the first buckle 24 may be indirectly attached to the seat 52, i.e., through an intermediate component such as the floor 56 supporting the seat 52, a bracket, webbing strap, cable, rigid stalk, etc. The first buckle 24 or intermediate component may be attached either directly to seat 52 or provide a buckle location proximate to seat 52, attaching to a load bearing component of the frame or body (not numbered) or any suitable location (for example a floor, pillar) of the vehicle 54. As another example, the first buckle 24 may be attached to the frame or body of the vehicle 54, or any suitable location. The first buckle 24 may be attached to the seat 52 by any suitable way including fasteners, welding, etc.

The second buckle 30 is fixed to the lap belt 26. For example, the second buckle 30 may be fixed to the lap belt 26 near the tongue 28. The second buckle 30 may be fixed to the second end 46 of the lap belt 26 in any suitable manner, such as, stitching, welding, fastening, etc. As shown in FIGS. 2, 3, 4, and 7, the second buckle 30 and the first tongue 28 may be stitched to the lap belt 26 with a common seam (not numbered). The first buckle 24 and the second buckle 30 may be of the same material or different material. For example, the first buckle 24 and the second buckle 30 may be of steel, aluminum, or any suitable material.

The first buckle 24 may include a slot 36 and a release button 38, and the second buckle 30 may include a slot 40 and a release button 42. The slot 36 of the first buckle 24 may be designed to receive the tongue 28, e.g., the tongue 28 and the first buckle 24 may operate in an engaged state when the tongue 28 is engaged with the slot 36. When the first tongue 28 and the first buckle 24 are in the engaged state, e.g., the two-point seat belt configuration or the three-point seat belt configuration, the lap belt 26 may extend from the lap retractor 20 to the first buckle 24. The release button 38 of the first buckle 24 may release the first tongue 28 from the slot 36 of the first buckle 24, e.g., the release button 38 may be spring loaded, as is known.

The slot 40 of the second buckle 30 may be designed to receive the second tongue 34, e.g., the second tongue 34 and the second buckle 30 may operate in an engaged state when the second tongue 34 is engaged with the slot 40. The release button 38 of the buckle 24 may release the tongue 28 from the slot 36, and the release button 42 of the second buckle 30 may release the second tongue 34 from the slot 40. When the second tongue 34 and the second buckle 30 are in the engaged state, e.g., the three-point seat belt configuration or the shoulder-buckled configuration, the shoulder belt 32 may extend from the shoulder retractor 22 to the second buckle 30. The release button 42 of the second buckle 30 may release the second tongue 34 from the slot 40 of the second buckle 30, e.g., the release button 42 may be spring loaded, as is known.

The seat belt assembly 18 includes the first tongue 28 fixed to the lap belt 26. For example, the first tongue 28 may be fixed to the second end 46 of the lap belt 26. The first tongue 28 may be fixed to the lap belt 26 in any suitable matter, such as, stitching, welding, fastening, etc. The first tongue 28 may be releasably engageable with the first buckle 24. For example, the first tongue 28 and the first buckle 24 may operate in the engaged state and a disengaged stated. In the engaged state, as shown in FIGS. 4-6 and 8, the first tongue 28 and the first buckle 24 restrict the lap belt 26 from pulling away from the first buckle 24. In the disengaged state, as shown in FIGS. 1-3 and 7, the first tongue 28 is spaced from the buckle 24 and the lap belt 26 is free to move away from the first buckle 24.

The seat belt assembly 18 includes the second tongue 34 fixed to the shoulder belt 32. For example, the second tongue 34 may be fixed to the second end 50 of the shoulder belt 32. The second tongue 34 may be fixed to the shoulder 32 in any suitable matter, such as, stitching, welding, fastening, etc. The second tongue 34 may be releasably engageable with the second buckle 30. For example, the second tongue 34 and the second buckle 30 may operate in the engaged state and a disengaged stated. In the engaged state, as shown in FIGS. 6 and 7, the second tongue 34 and the second buckle 30 restrict the shoulder belt 32 from pulling away from the second buckle 30. In the disengaged state, as shown in FIGS. 2-4, the second tongue 34 is spaced from the second buckle 30 and the shoulder belt 32 is free to move away from the second buckle 30. The first tongue 28 and the second tongue 34 may be formed of the same material or different material. For example, the first tongue 28 and the second tongue 34 may be formed of steel, aluminum, or any suitable material.

As set forth above, since both the first tongue 28 and the second buckle 30 are fixed to the lap belt 26, the first tongue 28 and the second buckle 30 move together as a unit, allowing for easy accessibility and operation of the lap belt 26 and easy cooperation with the second tongue 34 and the shoulder belt 32. The second buckle 30 may be at the second end 42 of the lap belt 26 adjacent the first tongue 28 and between the first tongue 28 and the lap retractor 20. For example, the first tongue 28 may be at a terminal end of the lap belt 26 and the second buckle 30 may be adjacent the first tongue 28 along the lap belt 26. This arrangement also allows for easy accessibility and operation of the lap belt 26 and easy cooperation with the second tongue 34 and the shoulder belt 32, including insertion of the tongues 28, 34 into respective buckles 30, 36 and operation of the release buttons 38, 42. The first tongue 28 and the second buckle 30 are fixed in position along the lap belt 26, and may be rotatable relative to each other and relative to the lap belt 26 for easy access when engaging the first tongue 28 with the first buckle 24 and engaging the second tongue 34 with the second buckle 30. As an example, the lap belt 26 may include loops, e.g., stitched loops, that engage the first tongue 28 and the second buckle 30 to fix the first tongue 28 and the second buckle 30 along the lap belt 26 and to allow the first tongue 28 and the second buckle 30 to rotate relative to each other and relative to the lap belt 26.

The first buckle 24, the second buckle 30, the first tongue 28, and the second tongue 34 may be configured so that the first tongue 28 is engageable with the first buckle 24 and is not engageable with the second buckle 30 and so that the second tongue 34 is engageable with the second buckle 30 and is not engageable with the first buckle 24. For example, the first tongue 28 and the second tongue 34 may have a different size and/or shape than each other. As an example, the first buckle 24 and the first tongue 28 may be sized and/or shaped to engage each other and not the second tongue 34 and the second buckle 30, respectively; and the second buckle 30 and the second tongue 34 may be sized and/or shaped to engage each other and not the first tongue 28 and the first buckle 24, respectively. These size and shape differences may be differences in length, width, and/or depth of the first tongue 28 and second tongue 34; differences in length, width, and/or depth of the slots 40 of the first buckle 24 and the second buckle 30; location of engaging holes on the first tongue 28 and the second tongue 34, etc.

With reference to FIG. 8, the seat belt assembly 18, configured as a two-point seat belt assembly, may accommodate a child restraint seat 58 and secure the child restraint seat 58 to the seat 52. In such an example, the child restraint seat 58 has an opening 60 to receive the first tongue 28, the lap belt 26 and the second buckle 30. The first tongue 28, the lap belt 26 and the second buckle 30 are each sized to fit through the opening 60. The lap belt 26 is configured to engage child restraint seat 58 on the seat 52 when the first tongue 28 is engaged with the first buckle 24 and the second tongue 34 is disengaged with the second buckle 30. The child restraint seat 58 is engaged with the lap belt 26 when the first tongue 28 is engaged with the first buckle 24.

To operate as a two-point seat belt assembly, the seat belt assembly 18 is in the two-point seat belt configuration as shown in FIGS. 4, 5, and 8. In the two-point seat belt configuration, the first tongue 28 and the first buckle 24 are in the engaged state, creating two points of connection, i.e., the first buckle 24 and the lap retractor 20. To operate as a three-point seat belt assembly, the seat belt assembly 18 is in the three-point seat belt configuration as shown in FIG. 6. In the three-point seat belt configuration, the first tongue 28 and the first buckle 24 are in the engaged state and the second tongue 34 and the second buckle 30 are in the engaged state, creating three points of connection, i.e., the first buckle 24, the lap retractor 20, and the shoulder retractor 22.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a seat;
   a lap retractor fixed to the seat and a lap belt retractably extendable from the lap retractor;
   a shoulder retractor fixed to the seat and a shoulder belt retractably extendable from the shoulder retractor;
   a first tongue fixed to the lap belt;
   a first buckle fixed relative to the seat and releasably engageable with the first tongue;
   a second buckle fixed to the lap belt; and
   a second tongue fixed to the shoulder belt and releasably engageable with the second buckle;
   the first tongue and the second tongue having a different size and/or shape than each other.

2. The assembly as set forth in claim 1, wherein the first buckle is fixed to the seat.

3. The assembly as set forth in claim 1, wherein the first buckle is fixed to the seat.

4. The assembly as set forth in claim 1, wherein the lap belt has a first end and a second end, the first end being engaged with the lap retractor and the second end being fixed to the first tongue.

5. The assembly as set forth in claim 4, wherein the second buckle is fixed to the second end.

6. The assembly as set forth in claim 1, wherein the shoulder belt has a first end and a second end, the first end being engaged with the shoulder retractor and the second end being fixed to the second tongue.

7. The assembly as set forth in claim 1, wherein the lap belt is configured to engage a child restraint seat on the seat when the first tongue is engaged with the first buckle and the second tongue is disengaged with the second buckle.

8. The assembly as set forth in claim 1, further comprising a vehicle floor, wherein the seat is moveable relative to the vehicle floor.

9. The assembly as set forth in claim 1, wherein the first buckle, the second buckle, the first tongue, and the second tongue are configured so that the first tongue is engageable with the first buckle and not engageable with the second buckle and so that the second tongue is engageable with the second buckle and not engageable with the first buckle.

10. The assembly as set forth in claim 1, wherein the seat includes a seat back having a front with the lap belt extending across the front of the seat back when the first tongue is engaged with the first buckle, and further comprising an airbag supported by the seat and inflatable across the front of the seat back.

11. The assembly as set forth in claim 10, wherein the seat back has a pair of bolsters spaced from each other and the airbag is supported by the seat back and extends from one bolster to the other bolster.

12. The assembly as set forth in claim 1, wherein at least one of said lap retractor, said shoulder retractor, and said first buckle are fixed to a load bearing member of a vehicle structure.

13. A seat belt assembly comprising:
a lap retractor and a lap belt retractably extendable from the lap retractor;
a shoulder retractor and a shoulder belt retractably extendable from the shoulder retractor;
a first tongue fixed to the lap belt;
a first buckle releasably engageable with the first tongue;
a second buckle fixed to the lap belt; and
a second tongue fixed to the shoulder belt and releasably engageable with the second buckle;
the first tongue and the second tongue have a different size and/or shape than each other.

14. The seat belt assembly as set forth in claim 13, wherein the lap belt has a first end and a second end, the first end being engaged with the lap retractor and the second end being fixed to the first tongue.

15. The seat belt assembly as set forth in claim 14, wherein the second buckle is fixed to the second end.

16. The seat belt assembly as set forth in claim 13, wherein the shoulder belt has a first end and a second end, the first end being engaged with the shoulder retractor and the second end being fixed to the second tongue.

17. An assembly comprising:
a seat;
a lap retractor fixed relative to the seat and a lap belt retractably extendable from the lap retractor;
a shoulder retractor fixed relative to the seat and a shoulder belt retractably extendable from the shoulder retractor;
a first tongue fixed to the lap belt;
a first buckle fixed relative to the seat and releasably engageable with the first tongue;
a second buckle fixed to the lap belt;
a second tongue fixed to the shoulder belt and releasably engageable with the second buckle; and
the lap belt is configured to engage a child restraint seat on the seat when the first tongue is engaged with the first buckle and the second tongue is disengaged with the second buckle; and
a vehicle floor, wherein the seat is moveable relative to the vehicle floor.

18. The assembly as set forth in claim 17, wherein the shoulder retractor is fixed to the seat and the lap retractor is fixed to the seat.

* * * * *